Dec. 18, 1934.  D. K. McILVAINE  1,985,048
ELECTRIC METER
Filed Aug. 25, 1932  3 Sheets-Sheet 1
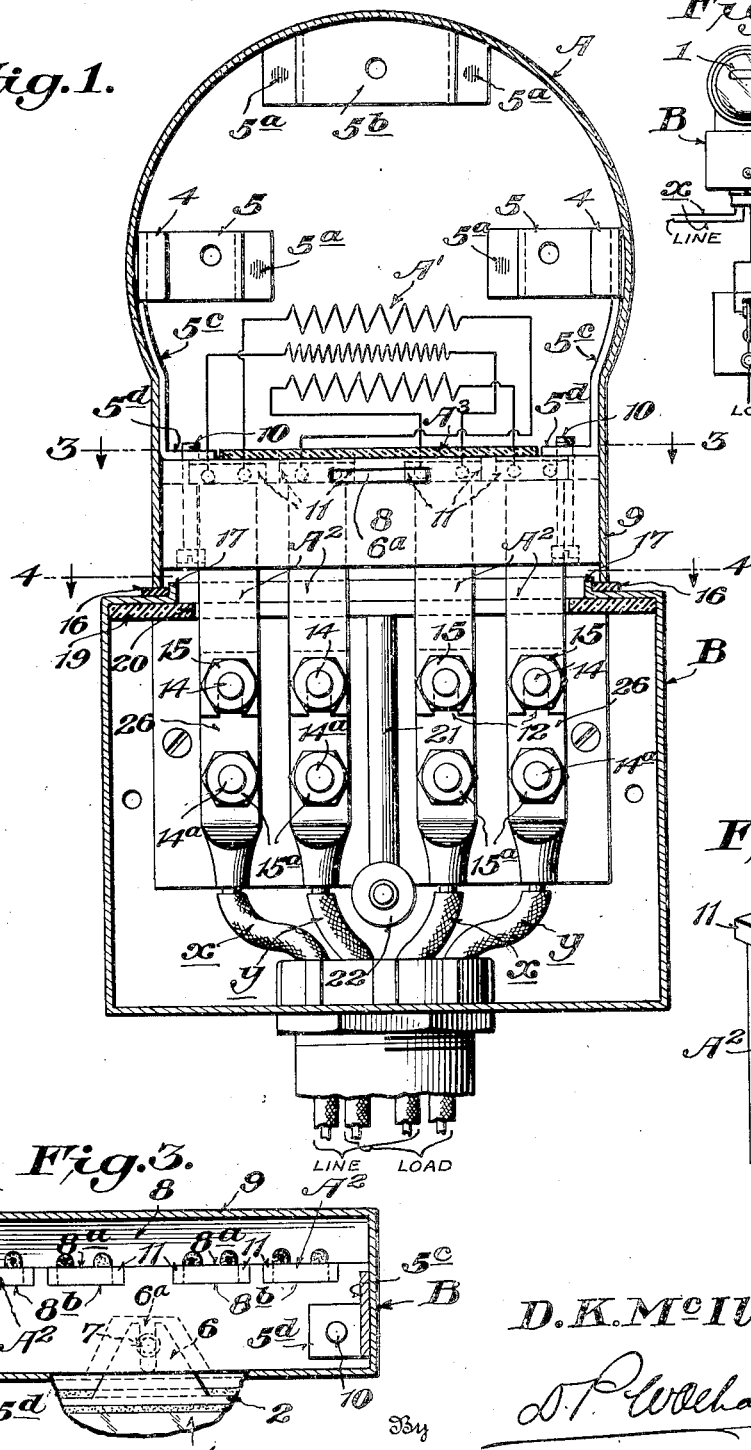
Inventor
D. K. McIlvaine,
By D. P. Wollander
Attorney Dec. 18, 1934. D. K. McILVAINE 1,985,048
ELECTRIC METER
Filed Aug. 25, 1932 3 Sheets-Sheet 2
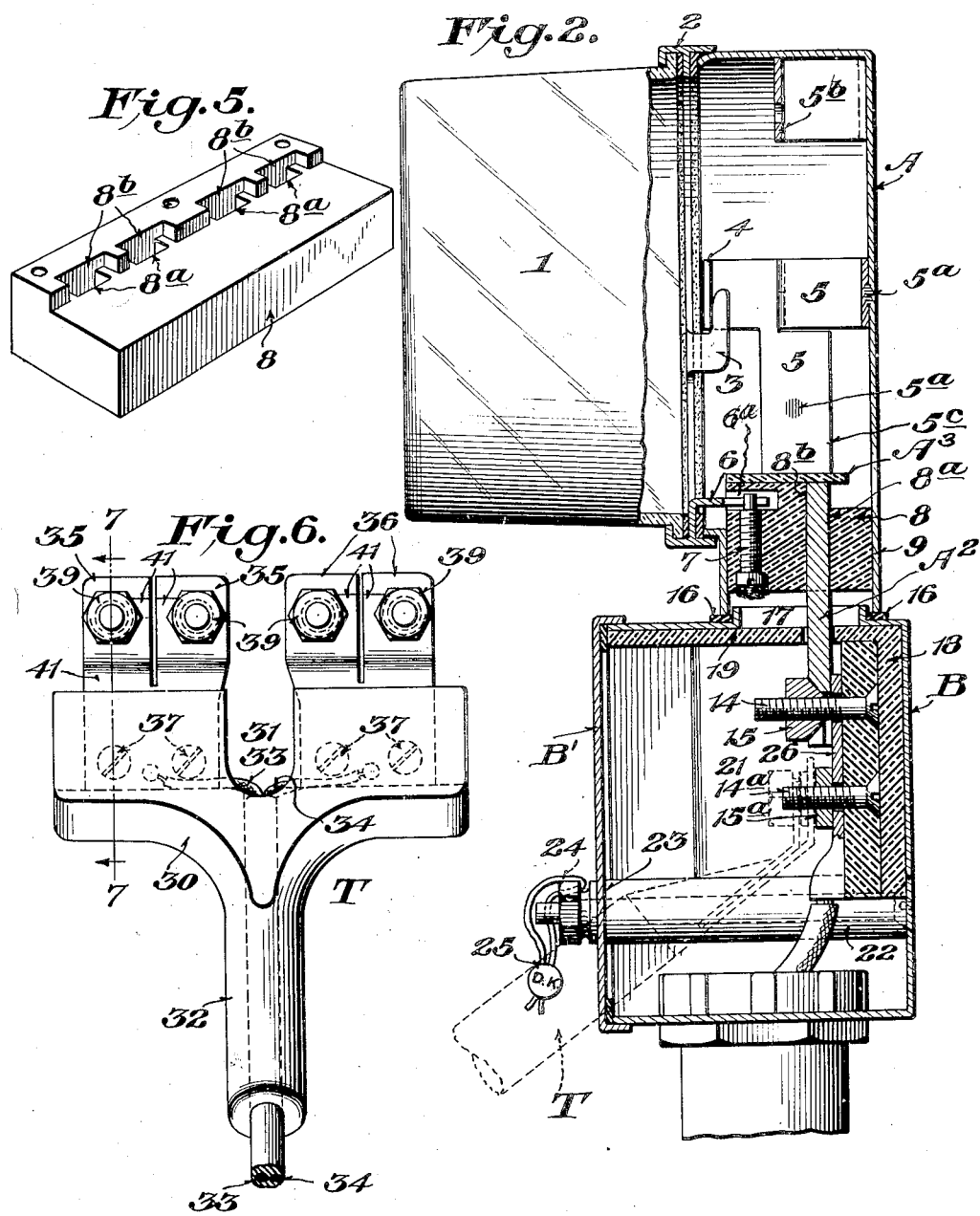
Inventor
D. K. McIlvaine,
By D. P. Wolhaupter
Attorney Dec. 18, 1934.  D. K. McILVAINE  1,985,048
ELECTRIC METER
Filed Aug. 25, 1932   3 Sheets-Sheet 3
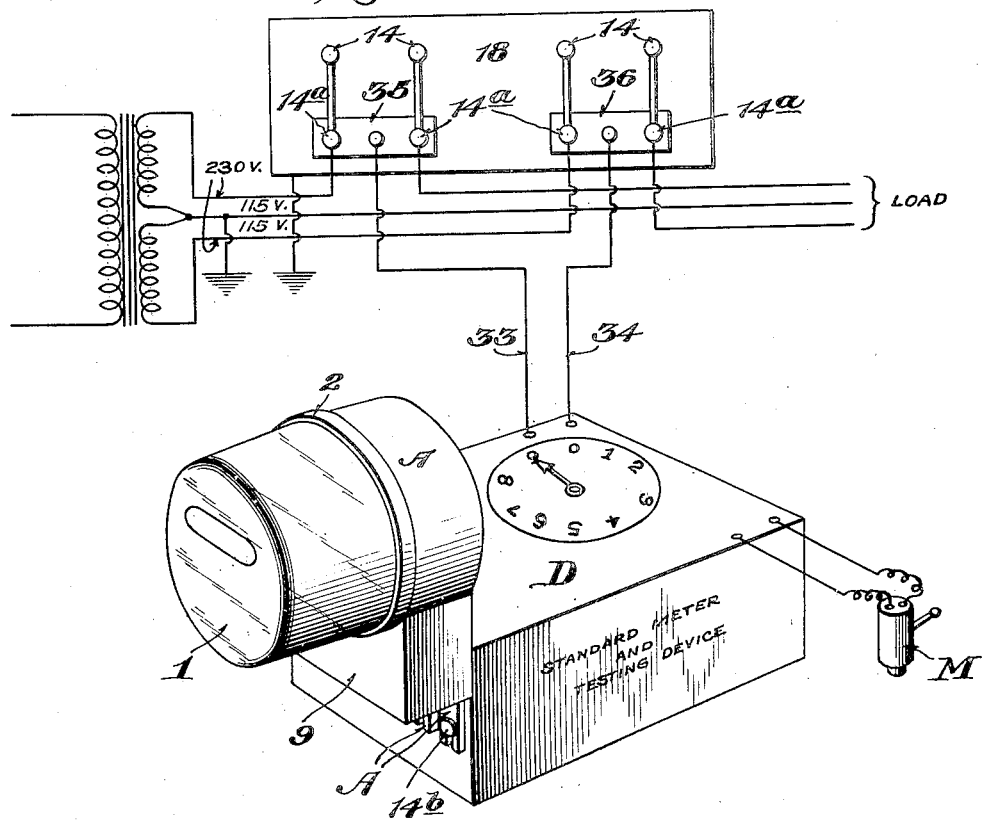
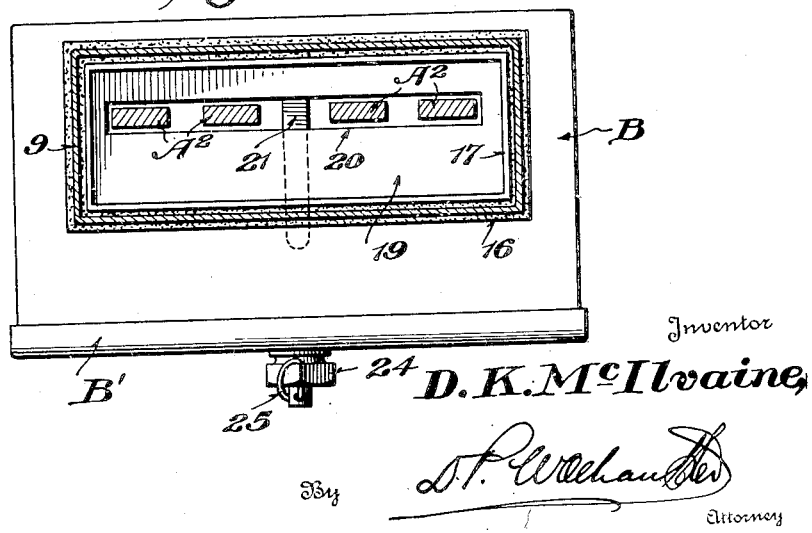

Patented Dec. 18, 1934

1,985,048

UNITED STATES PATENT OFFICE 1,985,048

ELECTRIC METER

Douglas K. McIlvaine, Connellsville, Pa., assignor to Westinghouse Electric & Manufacturing Company, East Pittsburgh, Pa., a corporation of Pennsylvania Application August 25, 1932, Serial No. 630,458

5 Claims. (Cl. 247—2)

This invention relates to electric meters, and more particularly to novel means for mounting the meter to insure the metering of all of the current supplied to the consumer, and also to facilitate testing of the meter without interrupting the consumer's service.

Heretofore, it has been the general practice to connect watthour meters in a circuit which is first protected by a line switch and fuses. This sequence, namely, switch-fuse-meter has been responsible for the development of many so-called meter switch boxes which ordinarily include a switch box providing a common housing for the line switch and line fuse, the meter being either supported on a separate panel or in some instances on the box, but in either instance the meter has been connected to the line by wire connections, as distinguished from rigid or bar connections, and, furthermore, unmetered connections are exposed. With this sequence it is, of course, necessary that the consumer have access to the switch box to enable him to renew fuses when necessary, this part of the equipment being usually considered the consumer's property. However, this practice is objectionable because it permits of persons who, though authorized to have access to the switch box are not, as a matter of fact, authorized to have access to unmetered lines, terminals or connections.

To eliminate the foregoing objections it is desirable to change the sequence heretofore generally used, namely, switch-fuse-meter to meter-switch-fuse, so that by the use of the latter sequence it is possible to mechanically disassociate the meter from the switch and fuse, except by properly guarded electrical connections and also to seal the meter. With the proposed practice, the disassociation may be carried so far that a meter may be mounted outside of the building while the switch and fuse box are mounted inside of the building. By following this sequence it will, of course, be possible as heretofore indicated, for the utility furnishing electric service, and which owns the meter, to seal the wiring to the meter and meter terminals while the customer who owns the switch and fuse box may freely have access thereto, but all of the lines in the switch box will be metered lines, thereby preventing the possibility of the unauthorized tapping of lines to obtain unmetered current.

While the present invention is particularly directed to a novel meter mounting and design adapted for use with the so-called new sequence above referred to, nevertheless, it will be understood that the same may be used in circuits of other sequences and even in circuits where there is no main switch and fuse box. That is to say, while the construction disclosed herein is particularly adaptable to installations employing the new sequence, nevertheless, it may be used in other sequences, as will be apparent when the nature of the construction is better understood.

Accordingly, a primary object is to provide a watthour meter mounting comprising a novel meter housing or casing and associated connection box which are not only weatherproof in themselves, but which are drawn into weatherproof relation when assembled by the mere act of locking the rigid meter contact terminals to the line terminals in the connection box. That is to say, the invention contemplates a construction wherein the meter casing, through the medium of the rigid meter terminals, can be forced to a weatherproof seat on the connection box, and, on the other hand may be safely and quickly removed from service position on the connection box to permit the meter to be tested. After testing, the meter may be readily replaced without causing the circuit to become grounded, short-circuited, or the meter incorrectly connected in the circuit, and when the meter is again locked in position by means of its terminals all parts of the mounting are again restored to weatherproof relation.

Another object of the invention is to provide a novel means and method for conveniently testing watthour meters while at the same time maintaining continuity of service in the consumer's line. In other words, by the use of the new devices described herein it is possible to facilitate testing or removal of the meter without interrupting the customer's service, and with a greater degree of safety to men making the test or removal. In many cases, meters are connected to an electric distribution system of large capacity which under the old practice of jumpering the lines and changing of meters offered hazards that were frequently dangerous, but by the new practice the tester is better able to exercise the necessary precautions while installing or removing the meter, because as a matter of fact the operations are simplified and the various parts so arranged that it is practically impossible for error or carelessness to become a factor in the changes.

A further object of the invention is to provide a meter, secured and locked in position by means of its own terminals, the said terminals, by reason of their size, being electrically more efficient than wires because they have the capacity of carrying surges or overloads without burning out or being ruptured due to unusual service conditions, thereby making fuses ahead of the meter unnecessary and eliminating the possibility of damage to meters from these conditions.

With the above and other objects in view, the invention consists in the novel features of construction, combination and arrangement of parts as will be hereinafter more fully described, illustrated in the accompanying drawings and defined in the appended claims.

A preferred and practical embodiment of the invention is shown in the accompanying drawings, in which:—

Figure 1 is a vertical sectional view of the improved meter mounting.

Figure 1a is a diagrammatic view illustrating the application of the present meter mounting in the meter-switch-fuse sequences proposed herein.

Figure 2 is a vertical sectional view taken at right angles to Figure 1, part of the same being in elevation.

Figure 3 is a detail horizontal sectional view taken on the line 3—3 of Figure 1.

Figure 4 is a detail horizontal sectional view taken on the line 4—4 of Figure 1.

Figure 5 is a detail perspective view of the insulation block secured in the meter casing for supporting the contact prongs.

Figure 6 is a detail view of a test jack used in the testing operation.

Figure 7 is a detail sectional view taken on the line 7—7, Figure 6.

Figure 8 is a diagrammatic view illustrating the manner in which the meter may be tested without interrupting continuity in the consumer's service.

Figure 9 is a detail perspective view of one of the prong contacts or fingers.

Similar reference characters designate corresponding parts throughout the several figures of the drawings.

Referring to the drawings, A designates the meter casing, the same being adapted to receive standard metering instrumentalities which form no part of the present invention, and are therefore merely diagrammatically indicated through the medium of the coils A' which illustrate the coil arrangement for a three-wire single phase meter. The meter casing A is mounted on a connection box B, in the novel manner hereinafter referred to more in detail, but, suffice it to say for the present that the meter casing is intended to be detachably locked to the connection box through the medium of the contact prongs or fingers A² which project from one side of the meter casing thereby to enter the connection box to make electrical contact with the line terminals and also be locked in position. The connection box B is provided with a cover B', as shown in Figure 2, said cover being adapted to be locked and sealed against access to anyone except to agents of the utility furnishing the service. Therefore, it will be apparent that the meter casing A may be mechanically and electrically locked from the inside of the connection box B so as to prevent its unauthorized removal except by the proper parties.

Before proceeding with a further detailed description of the mounting, reference may be made to Figure 1a which illustrates the manner of installing the meter and its mounting in the service line. As will be observed from this figure the power lines $x$ are led into the connection box B to the proper terminal studs in the box so that when the meter and meter casing A are mounted on the box B all of the current furnished over the lines $x$ will pass through the metering instrumentalities A' and thence to the consumer's service lines $y$ which are led into the consumer's service box C containing the switch S and the fuses F where such service is used. It will, of course, be understood that the lines $x$ and $y$ are led through usual pipe conduits so that with the present arrangement the consumer can only have access to metered lines or terminals with the arrangement shown and which is the meter-switch-fuse sequence previously referred to.

Referring now to the features of the meter casing A it will be observed that the same is preferably formed in one piece, the body thereof being shaped to accommodate the meter instrumentalities and provided at one side thereof with a meter cover 1, preferably of glass, in accordance with the usual custom, the said cover 1 being provided with a metallic rim 2 properly weatherproofed where it joins with the glass and carrying at its inner side a plurality of bayonet locking fingers 3 adapted to cooperate with the lugs 4 of the brackets 5 so that by a partial rotary movement of the cover 1 the parts 3 and 4 may be interlocked in a convenient manner. In addition to being provided with bayonet members 3 the rim 2 is also provided with an offset keeper member 6 which is adapted to receive a locking element 7 fitted in the insulation block 8 mounted in the neck portion 9 of the meter casing A. The purpose of the locking element 7 is to prevent rotational movement of the cover 1 to thereby prevent unauthorized removal thereof, the locking element or screw 7 being entirely contained within the neck 9 of the casing, as will be readily apparent from Fig. 2.

The brackets 5 are preferably spot welded to the casing as indicated at 5ª to avoid openings in the casing and insure full weatherproofing thereof. These brackets 5, together with the bracket 5ᵇ, are intended to support the base of the meter instrumentalities, and as will also be apparent from Figures 1 and 2, the brackets 5 are provided with downwardly extending arms 5ᶜ, which have the offset portions 5ᵈ adapted to receive the fastening screws 10 which lock the insulation block 8 within the neck 9 of the casing.

The insulation block 8 is, therefore, rigidly mounted in the meter casing, and this is an important factor inasmuch as this block assumes the strain incident to locking the meter casing A and connection box B together through the medium of the contact prongs A².

As will be observed from Fig. 2, the keeper 6 of the cover fits into the slot 6ª of the block so that even if the screws 10 are removed when the meter is dismounted from the connection box, it will be impossible to withdraw the block 8 from the neck 9 without breaking the sealing material 7ᵇ which covers the head of the screw 7. Thus, the meter casing 1 is effectually locked against unauthorized removal.

Referring to Figure 5, it will be apparent that the insulation block 8 is provided with a plurality of channels 8ª and the upper surface of the block above the channels or openings 8ª is provided with the socket formations 8ᵇ thereby to receive the T-shaped head portions 11 of the contact prongs or fingers A². The contact fingers or prongs A² are preferably made of relatively heavy metal stock and may be soldered to the coil wires in the manner shown in Figures 1 and 9.

In assembling, it will of course be understood that the meter instrumentalities unit A' including the contact prongs A², and having the insulation sheet A³ overlying the heads 11 of the prongs, is first placed in position in the casing A. Then the insulation block 8 is placed in the neck 9 and secured to the offet portions 5ᵈ of the brackets 5 by the screws 10. The cover 1 may then be placed in position and locked through the means heretofore described so that thereafter it will be apparent that the entire meter casing A may be handled as a unit, with the prongs A² projecting from one side thereof.

Referring further to the contact prongs or fingers A², it will be observed from Figure 9 that the lower ends thereof are slotted as indicated at 12 and at the inner end of the slot the face of the finger is countersunk as indicated at 13. The purpose of this arrangement is to permit the contact fingers or prongs to engage over the meter contact studs 14 in the connection box B and then receive a nut 15 having a conical face. The effect of screwing home the nuts 15 on the studs 14, after the prong contacts or fingers are engaged with the studs, is to draw or wedge the entire meter casing A firmly down onto the gasket 16 surrounding the flange opening 17 in one of the side walls of the box B. In this way the contact prongs or fingers may be securely locked to the studs 14 and at the same time the members A and B will be tightly drawn together in weatherproof relation.

The connection box B in addition to being provided with the weatherproof cover B' previously referred to and the flanged opening 17, which is in effect telescopically related with the neck 9 of the meter casing A, is also provided with suitable insulation 18 to thoroughly insulate the connection box from the studs 14 which carry line voltages. It will, of course be understood that, although the drawings show separate insulation pieces for protecting the metallic box B, it is within the province of the invention to have the insulation molded in one piece, if desired, so long as the desired insulating results are obtained. In that connection, one of the features of the invention resides in providing an insulation piece 19 for masking the opening 17 except for the slot 20 therein (Figure 4) so that when the meter casing is being mounted on the connection box, the prongs A² will not come in contact with any of the metallic parts of the connection box. In other words, the slot 20 in the insulation 19, not only serves as a guide for properly positioning the prongs A², but also prevents shorting or grounding incident to the placing or removal of the meter on or from the connection box B. As an additional safety factor to prevent grounding or shorting between the prongs A² and the studs 14, the insulation 18, previously referred to is provided with a central barrier 21 which effectually separates the incoming line terminals and the outgoing load carrying terminals. The connection box B is also provided with the cover anchoring post 22 which is preferably insulation, mounted on a suitable bolt or equivalent support anchored to the box, and having its front end 23 adapted to provide an abutment for the gasketed cover B' so that when the nut or equivalent fastening 24 is applied, the cover B' will be locked rigidly in position. As shown, the member 24 may be sealed with a suitable seal 25 to insure only the proper access to the connection box.

In addition to the meter contact studs 14, a second set of terminal studs 14ᵃ serving as test studs are mounted below the first set previously referred to, the said studs 14ᵃ not only serving to assist in securing the line wire terminals 26 in position with the aid of the nuts 15ᵃ, but also providing testing points for jumpering the lines through the medium of the test jack T or its equivalent when it is desired to maintain continuity of service in the line and at the same time permit of the change of meters or the removal of the particular meter for testing. That is to say, when it is desired to test the meter and maintain current to the consumer's service outlets it is only necessary for the agent of the utility to remove the cover B' from the connection box B and apply the test jack T to the terminals 14ᵃ, the meter still being in position and engaged with the terminal studs 14. After the test jack T has been placed in position as shown in dotted lines in Figure 2, the nuts 15 may be turned back on the studs 14 sufficiently to draw the cone-shaped heads thereof out of the sockets 13, thereby releasing the meter prongs A² and permitting of the removal of the entire meter. The meter can then be placed on a standard meter and testing device D as shown in Figure 8 and tested, or a new meter can be put in place. After the meter has been tested or a new one has been placed in position on the studs 14, the test jack T may be removed and the current again permitted to flow through the meter in the usual manner.

Referring further to the test jack T and the method of using the same, it may be pointed out, by reference to Figures 6 and 7 that the said jack includes an insulating body 30 provided with a central notch 31 to enable the same to clear the post 22 and barrier 21, and is also provided with a handle 32, through which the test wires 33 and 34 are led. The insulating body 30 of the jack is provided with metal jumper straps 35 and 36 secured to the body 30 by means of the fastenings 37. The front portions of the straps 35 and 36 are provided with openings for receiving the shank portions 38 of special nut members 39, the said nut members having their shank portions 38 provided with a collar 40 which enables the lower portion of the shank 38 to fit in the opening provided in the strap while a portion of the shank between the collar 40 and the head of the nut is adapted to be engaged by a spring finger 41. With this arrangement it will be apparent that the nuts 39 are held in position on the straps 35 and 36 at all times so that the testing jack may be readily applied to the terminal studs 14ᵃ without the necessity of the tester placing the nuts on the studs with the aid of his hands or fingers. The test jack with the nuts 39 thereon is merely placed in position whereby the studs 14ᵃ can receive the nuts 39, and then the tester may take a socket wrench having an insulated handle and screw the nuts 39 on the studs 14ᵃ. As will be apparent from Figures 2 and 8, when the test jack T is in position, the lines are properly jumpered so as to maintain continuous service to the consumers' outlets, while current for testing the meter may be supplied by the wires 33 and 34 to the testing device D. The meter A may have its prongs A² fitted over the studs 14ᵇ on the side of the device D. When the meter is thus in position on the device D the tester can control the current through a suitable switch M and the usual testing operations may be readily completed and after testing the meter can be replaced, or if the meter is found to be defective a new one may be positioned on the connection box B.

From the foregoing it will be apparent that the present invention not only provides means for locking the meter in the line ahead of the exposed consumers' outlets but also permits of testing the meter or changing the same in a safe, practical and expeditious manner.

Another feature of the invention resides in the novel method made possible by the use of the present apparatus for facilitating the testing of the meters in situ. That is to say, the arrangement described herein permits of transporting the standard meter and testing device D to the meter location and connecting the same through the leads 33 and 34 associated with the test jack T, to the line terminals at the junction of the meter therewith. When the test jack has been applied to the terminal studs, the continuity of service in the lines will be maintained as previously explained, and then the meter may be disconnected from the line and removed so that it can be placed on the testing terminals of the device D. The meter can then be tested without interrupting the service in the customer's line, and if found satisfactory can be replaced, or a new one can be inserted in the mounting as desired. The arrangement and method described is superior to existing methods because it eliminates wiring between the testing device and the meter. According to present practice it is not only necessary to use a number of loose wires in connecting the testing device D to the line wires, but it is also necessary to use wire connections between the meter which is usually anchored in a fixed position, and the testing device. The use of a plurality of wires not only requires time to make the connections, but is also dangerous to the operator. However, by the present method of jumpering the lines to the meter device by a single cable and then removing the meter and placing it on the testing device, not only is the testing of the meter facilitated, but safety is insured.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a mounting for electric meters, a connection box having a flanged opening, a gasket surrounding said flanged opening, a meter casing for housing the meter structure and having a tubular neck portion adapted to fit over the flanged opening in engagement with said gasket, prong contacts projecting from the meter casing and adapted to enter said opening in the connection box, line wire studs within the connection box adapted to engage with said prong contacts, and cooperating means on said contacts and studs for securing the contacts to the studs and simultaneously drawing the meter casing onto said gasket.

2. In a mounting for electric meters, a connection box having an opening in one wall thereof and open at one side, a weatherproof cover for said open side, line wire terminal studs mounted in the connection box, a meter casing including a portion for housing the meter coils and having a neck portion, a plurality of rigid prong contacts carried by the meter casing and projecting through and beyond the neck thereof, whereby the ends of said contacts may engage with said line wire terminal studs when the neck of the meter casing engages with the wall of the connection box having the opening, and cooperating means on said contacts and terminal studs for connecting said contacts with the studs and simultaneously drawing the meter casing against the connection box.

3. A weatherproof mounting for electric meters including a connection box having a flanged opening in one wall thereof, a weatherproof cover for one side thereof adapted to be sealed against unauthorized access, conduit means for the connection box, line wire terminal studs rigidly mounted in the connection box and connected with line wires led through said conduit means, a meter casing for housing the meter instrumentalities and including a neck portion adapted to cooperate with the flanged opening of the connection box to form a weatherproof joint, an insulation member rigidly secured in the meter casing, a plurality of prong contacts interlocked with the insulation block and projecting beyond the meter casing thereby to enter the flanged opening of the connection box to engage with the line wire terminal studs, and means for connecting the prong contacts and studs thereby to lock the meter casing to the connection box and also to draw the meter casing against the connection box in weatherproof relation.

4. A mounting for electric meters including the combination with a connection box and meter casing, of a fixed line wire terminal stud in the connection box, a meter contact element electrically connected with the meter coils and having a portion thereof slotted to receive said stud, said contact having a countersunk portion communicating with the slot, and a nut element adapted to fit on said stud and having a substantially conical face adapted to fit into said countersunk portion of the contact to draw the meter casing and connection box together.

5. In a mounting for electric meters, a connection box having a flanged opening, a meter casing for housing the meter structure and have a tubular neck portion proportioned to fit around the flange of said opening, contacts projecting from said tubular neck portion of the meter casing and adapted to enter said opening in the connection box, terminal studs within the connection box adapted to engage said projecting contacts, and cooperating means on said contacts and studs for securing the contacts to the studs and for simultaneously drawing the meter casing against the connection box when the contacts and studs are secured together.

DOUGLAS K. McILVAINE.